(12) United States Patent
Storey et al.

(10) Patent No.: US 11,613,126 B2
(45) Date of Patent: Mar. 28, 2023

(54) PRINT PARTICLE REPLENISHMENT DEVICE

(71) Applicant: Hewlett-Packard Development Company, L.P., Spring, TX (US)

(72) Inventors: Matthew James Storey, Austin, TX (US); Zackary Thomas Hickman, Austin, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 303 days.

(21) Appl. No.: 17/046,054

(22) PCT Filed: Aug. 30, 2018

(86) PCT No.: PCT/US2018/048866
§ 371 (c)(1),
(2) Date: Oct. 8, 2020

(87) PCT Pub. No.: WO2020/046343
PCT Pub. Date: Mar. 5, 2020

(65) Prior Publication Data
US 2021/0031532 A1 Feb. 4, 2021

(51) Int. Cl.
*B41J 2/175* (2006.01)
*G03G 15/08* (2006.01)
*B33Y 30/00* (2015.01)

(52) U.S. Cl.
CPC ........ *B41J 2/17506* (2013.01); *G03G 15/087* (2013.01); *B33Y 30/00* (2014.12)

(58) Field of Classification Search
CPC .... B41J 2/175; B41J 2/17503; B41J 2/17506; B41J 2/17523; B41J 2/17553; G03G 15/087; G03G 15/0886; G03G 21/1647; G03G 2215/087; B33Y 30/00
See application file for complete search history.

(56) References Cited

U.S. PATENT DOCUMENTS

| | | | |
|---|---|---|---|
| 4,603,714 A | 8/1986 | Marotta | |
| 4,615,364 A | 10/1986 | Kawata | |
| 5,515,143 A | 5/1996 | Shiotani | |
| 5,848,338 A | 12/1998 | Okada | |
| 6,236,826 B1 | 5/2001 | Kurz et al. | |
| 6,332,065 B1 | 12/2001 | Howard | |
| 6,363,235 B1 | 3/2002 | Chiesa et al. | |
| 6,421,518 B1 | 7/2002 | Floyd et al. | |
| 6,785,497 B1 | 8/2004 | Hasebe | |
| 7,647,012 B2 * | 1/2010 | Yamada | G03G 15/0886 399/262 |

(Continued)

FOREIGN PATENT DOCUMENTS

| | | |
|---|---|---|
| CN | 1113575 A | 12/1995 |
| CN | 1512277 A | 7/2004 |

(Continued)

*Primary Examiner* — Anh T Vo
(74) *Attorney, Agent, or Firm* — Foley & Lardner LLP (57) ABSTRACT

Examples of a print particle replenishment device are described herein. Some examples of the print particle replenishment device may include an interfacing portion. Some examples of the interfacing portion may include a ramp to actuate a hinging door. In some examples, the hinging door may be on a host device receptacle.

14 Claims, 6 Drawing Sheets

(56) References Cited

U.S. PATENT DOCUMENTS

| | | | |
|---|---|---|---|
| 7,917,055 B2 * | 3/2011 | Katsuyama | G03G 15/0877 222/DIG. 1 |
| 2001/0008592 A1 | 7/2001 | Harris et al. | |
| 2004/0091288 A1 | 5/2004 | Yahagi | |
| 2008/0279593 A1 | 11/2008 | Kitaoka | |

FOREIGN PATENT DOCUMENTS

| EP | 0 306 217 A2 | 3/1989 |
|---|---|---|
| EP | 0 689 104 A1 | 12/1995 |
| EP | 1 209 537 A2 | 5/2002 |

* cited by examiner

PRINT PARTICLE REPLENISHMENT DEVICE

BACKGROUND

Some types of printing utilize print particles, such as print toner or powder. For example, three-dimensional (3D) printing may utilize one or more kinds of print particles. In some examples of 3D printing, 3D solid parts may be produced from a digital model using an additive printing process. 3D printing may be used in rapid prototyping, mold generation, mold master generation, and short-run manufacturing. Some 3D-printing techniques are considered additive processes because they involve the application of successive layers of build material. In some 3D-printing techniques, the build material may be cured or fused. Laser jet printing may utilize print toner. For example, a printer may cause toner particles to be fused to a piece of paper.

DETAILED DESCRIPTION

Some printing technologies utilize print particles. Examples of print particles include three-dimensional (3D) print powder and toner. In some examples, an average diameter of 3D print powder particles of this disclosure may be less than 50 microns and/or an average diameter of toner particles of this disclosure may be less than 20 microns. It should be noted that in some examples, some print particles may be round, approximately round, or non-round. Print particles may become airborne and contaminate the environment if not controlled. Control may be difficult when print particle bottles are supplied to inexperienced users in environments like offices or homes (e.g., home offices). Flow characteristics of particles may be harder to predict than, for example, fluids. As can be observed from this discussion, devices and techniques that enable cleaner and simpler transfer of print particles may be beneficial.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

Figure 1:
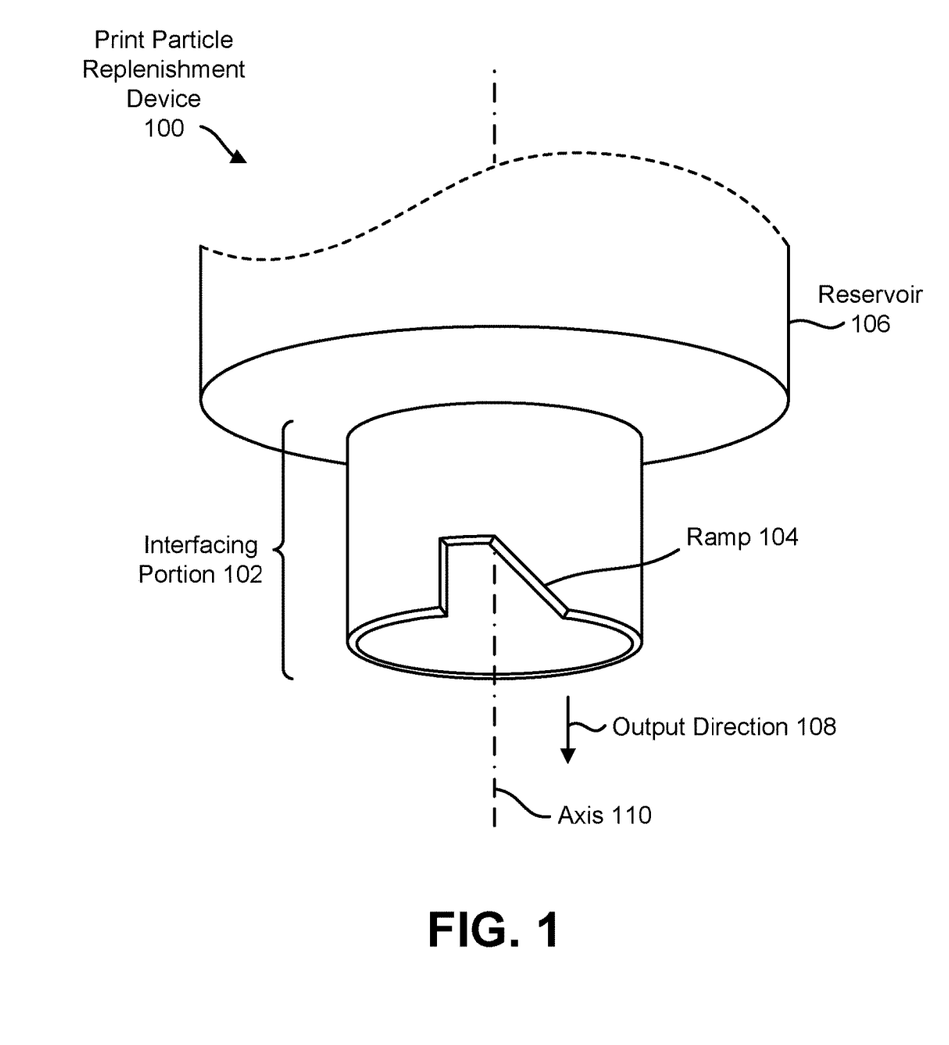
FIG. 1 is a perspective view of an example of a print particle replenishment device.

FIG. 1 is a perspective view of an example of a print particle replenishment device 100. A print particle replenishment device may be a container that holds print particles for donation (e.g., transfer or delivery) to a host device (e.g., print cartridge and/or printer). Examples of the print particle replenishment device 100 include containers and bottles. The print particle replenishment device 100 may contain and/or transfer print particles. For example, the print particle replenishment device 100 may be designed to interface with a host device. A host device is a device that uses and/or applies print particles. Examples of a host device include printers and print cartridges. For example, it may be beneficial to replenish or refill a printer and/or print cartridge with print particles. For instance, a host device may have a useful life beyond use of an amount (e.g., contained amount) of print particles. Accordingly, it may be beneficial to replenish a container in a host device with print particles rather than replacing the host device.

In the example illustrated in FIG. 1, the print particle replenishment device 100 includes an interfacing portion 102. The interfacing portion 102 may be a portion of the print particle replenishment device 100 that is adapted to transfer print particles and/or deliver print particles to a host device from a storage portion of the print particle replenishment device 100 (e.g., a reservoir 106). For example, the interfacing portion 102 may interface with a host device (e.g., a receptacle of a host device). Although the interfacing portion 102 is illustrated as having a smaller dimension (e.g., width, diameter, radius, etc.) than the remainder of the print particle replenishment device 100 (e.g., the reservoir 106) in FIG. 1, the interfacing portion 102 may have a smaller dimension, a same dimension, or a larger dimension than a remainder of the print particle replenishment device 100.

The output structure 332 may be implemented in a variety of shapes. In some examples, the interfacing portion 102 may be approximately cylindrical (e.g., cylindrical, conical, tubular, etc.) in shape. In some examples, the interfacing portion 102 may have another shape (e.g., polygonal, irregular, prismatic, etc.). An "output neck" may be an example of the interfacing portion 102 that is narrower (e.g., smaller in a dimension, width, diameter, and/or radius) than the remainder of the print particle replenishment device 100 or a reservoir 106 of the print particle replenishment device 100. A "cylindrical output neck" may be an example of the interfacing portion 102 that is cylindrical in shape and narrower (e.g., smaller in a dimension, width, diameter, and/or radius) than the remainder of the print particle replenishment device 100 or a storage portion of the print particle replenishment device 100. As used herein, the term "cylindrical" may mean approximate conformity to a cylinder shape. For example, a cylindrical interfacing portion may include one or more portions that conform to or approximate a cylinder shape. For instance, a cylindrical interfacing portion may include one or more outer curved sections and/or an approximately circular end or base, while another end may or may not be circular.

In some examples, the interfacing portion 102 may be or may include a cylindrical wall structure. For example, the interfacing portion 102 may include a wall structure that is approximately cylindrical in shape. In some examples, the wall structure may take another shape (e.g., square, rectangle, elliptical, conical, irregular, etc.).

The interfacing portion 102 may include an end portion (e.g., bottom). In some examples, the end portion may be a portion of the interfacing portion 102 that contacts (e.g., abuts against) a host device (e.g., host device receptacle) during initial engagement. In some examples, the end portion (or at least a part of the end portion) may be perpendicular to an axis 110 (e.g., central axis, rotating axis) of the interfacing portion 102 and/or may be perpendicular to an output direction 108. In some examples, the axis 110 is an axis about which the interfacing portion 102 rotates during docking with a host device. The axis 110 may be a central axis of the interfacing portion 102 and/or of the print particle replenishment device 100.

The print particle replenishment device 100 (e.g., interfacing portion 102) may include a ramp 104. The ramp 104 may be adapted to actuate a hinging door on a host device receptacle. For example, a host device may include a port (e.g., hole, channel, etc.) that is covered with a hinging door. In some examples, when the print particle replenishment device 100 is inserted into the host device receptacle, the ramp 104 may actuate (e.g., push, move aside) the hinging door and/or a hinging door arm. Actuating the hinging door and/or hinging door arm may cause the port to open (e.g., to become uncovered). For example, the hinging door may slide and/or rotate relative to a hinge or pivot when actuated by the ramp 104. In some examples, the pivot or hinge may be offset from the axis 110 (e.g., central axis, rotating axis) of the print particle replenishment device 100 when the print particle replenishment device is engaged.

In some examples, the print particle replenishment device 100 may be adapted to open an output opening (not shown in FIG. 1) of the print particle replenishment device 100. For example, the interfacing portion 102 may be adapted to open the output opening when rotated relative to a host device or host device receptacle. The output opening may be an opening through which print particles may be transferred or delivered. For example, the output opening may be a hole, tube, nozzle, funnel, etc. It should be noted that the output opening may have different shapes and/or locations. For example, the output opening may be a notch, ellipse, kidney, crescent, circle, square, rectangle, slot, semi-circle, irregular in shape, or may have another shape. The output opening may be offset from the axis 110 or may be located on the axis 110.

In some examples, the print particle replenishment device 100 may include a reservoir 106 for storing print particles (e.g., print powder, toner, etc.). In some examples, the interfacing portion 102 may represent a narrower section of the print particle replenishment device 100 than the reservoir 106. In some examples, the print particles may flow through an opening (e.g., output opening) generally along an output direction 108 of the print particles (e.g., print particle output direction).

In some examples, one or more of the features (e.g., structures, portions, planes, disks, covers, etc.) described herein may relate to the output direction 108 (e.g., may be perpendicular to the output direction 108, may be parallel to the output direction 108, may rotate with respect to the output direction 108, etc.) instead of or in addition to the axis 110 (e.g., a central axis or rotating axis). In some examples, the output direction 108 may be a general direction of print particle flow. In some examples, the general direction of print particle flow may be generally in the direction of gravity when the interfacing portion 102 is in a docked position. For example, the interfacing portion 102 may be oriented vertically with respect to gravity when docked. In other examples, the interfacing portion 102 may be oriented in different orientations.

Figure 2:
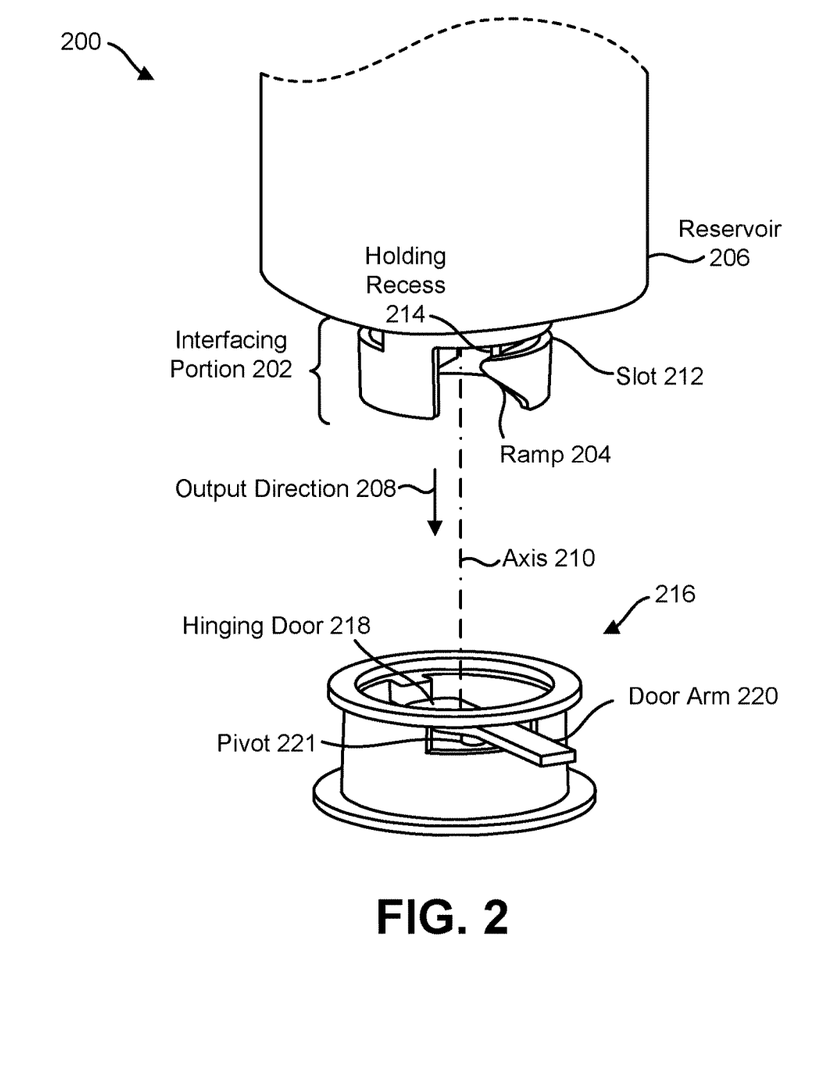
FIG. 2 is a perspective view of another example of a print particle replenishment device and an example of a host device receptacle.

FIG. 2 is a perspective view of another example of a print particle replenishment device 200 and an example of a host device receptacle 216. The print particle replenishment device 200 may be an example of the print particle replenishment device 100 described in connection with FIG. 1. In this example, the print particle replenishment device 200 includes a reservoir 206 and an interfacing portion 202. The interfacing portion 202 may include a ramp 204, a slot 212, and/or a holding recess 214. In some examples, the interfacing portion 202 may include a cylindrical wall structure.

The host device receptacle 216 may be attached to and/or may be part of a host device (e.g., cartridge, printer, etc.). In some examples, the host device receptacle 216 may include a recess (e.g., cylindrical recess, conical recess, rectangular recess, irregular shaped recess, prismatic recess, etc.) into which the interfacing portion 202 may be inserted. In some examples, the host device receptacle 216 may be disposed within a housing of the host device. In some examples, the host device receptacle 216 may be disposed on or above a housing of the host device. The host device receptacle 216 may be adapted to receive print particles from the print particle replenishment device 200.

In some examples, the host device receptacle 216 may include a hinging door 218. In some examples, the host device receptacle 216 may include a door (e.g., cover) arm 220. The door arm 220 may be an extension of the hinging door 218. In some examples, the door arm 220 may protrude beyond a side wall of the host device receptacle 216. In other examples, the door arm 220 may be disposed within the side wall (e.g., may not protrude). The ramp 204 may be adapted to actuate (e.g., deflect) the hinging door 218 and/or door arm 220 to open a port of the host device receptacle 216. For example, as the interfacing portion 202 is inserted (e.g., pressed) into the host device receptacle 216, the hinging door 218 and/or door arm 220 may slide along the ramp 204 to move the hinging door 218 off of the port. In some examples, the hinging door 218 and/or door arm 220 (e.g., cover arm) may deflect in a plane that is perpendicular to an insertion direction.

In some examples, the hinging door 218 may deflect, rotate, and/or move relative to a hinge or pivot 221. In some examples, the pivot or hinge may be offset from the axis 210 (e.g., central axis, rotating axis) of the print particle replenishment device 200 at engagement. In some examples, the pivot of hinge may be offset from an axis (e.g., central axis) of the host device receptacle.

In some examples, the interfacing portion 202 (e.g., cylindrical wall structure) includes a slot 212. The slot 212 may be adapted to receive the hinging door 218 and/or door arm 220 as the print particle replenishment device 200 rotates (e.g., rotates about an axis 210). In some examples, the slot 212 is in a plane perpendicular to an output direction 208 of the print particle replenishment device 200. In some examples, the slot 212 is in a plane perpendicular to an axis 210 (e.g., central axis, rotating axis, etc.) of the print particle replenishment device 200.

In some examples, the slot 212 may be adapted to receive the hinging door 218 (and/or door arm 220) and hold the print particle replenishment device 200 on the host device (e.g., host device receptacle 216). For example, the slot 212 may be adapted to receive the hinging door 218 (and/or door arm 220) and hold the print particle replenishment device 200 on the host device (e.g., host device receptacle 216) when the print particle replenishment device 200 is rotated.

For instance, as the print particle replenishment device 200 is rotated, the slot 212 may interfere with the hinging door 218 and/or door arm 220 when the print particle replenishment device 200 is rotated along the insertion direction (e.g., along the output direction 208 and/or along a direction of the axis 210). The interference may prevent the print particle replenishment device 200 from being removed (in a direction opposite to the insertion direction, for example) when the print particle replenishment device 200 (e.g., interfacing portion 202) is rotated from an insertion position.

In some examples, the slot 212 may allow the hinging door 218 to maintain a static position during rotation of the print particle replenishment device 200. For example, once the print particle replenishment device 200 is inserted, the hinging door 218 and/or door arm 220 may maintain a static position while the print particle replenishment device 200 is rotated. The slot 212 may accommodate the rotation of the print particle replenishment device 200 by receiving the hinging door 218 and/or door arm 220 as the print particle replenishment device 200 rotates.

In some examples, the print particle replenishment device 200 (e.g., interfacing portion 202) may include a holding recess 214. The holding recess 214 may be adapted to hold the hinging door 218 in a static position during rotation of the print particle replenishment device 200. In some examples, the holding recess 214 may be disposed at an end of the ramp 204. For example, the holding recess 214 may receive and/or engage with the hinging door 218 and/or door arm 220 when the interfacing portion 202 is fully inserted.

Figure 3:
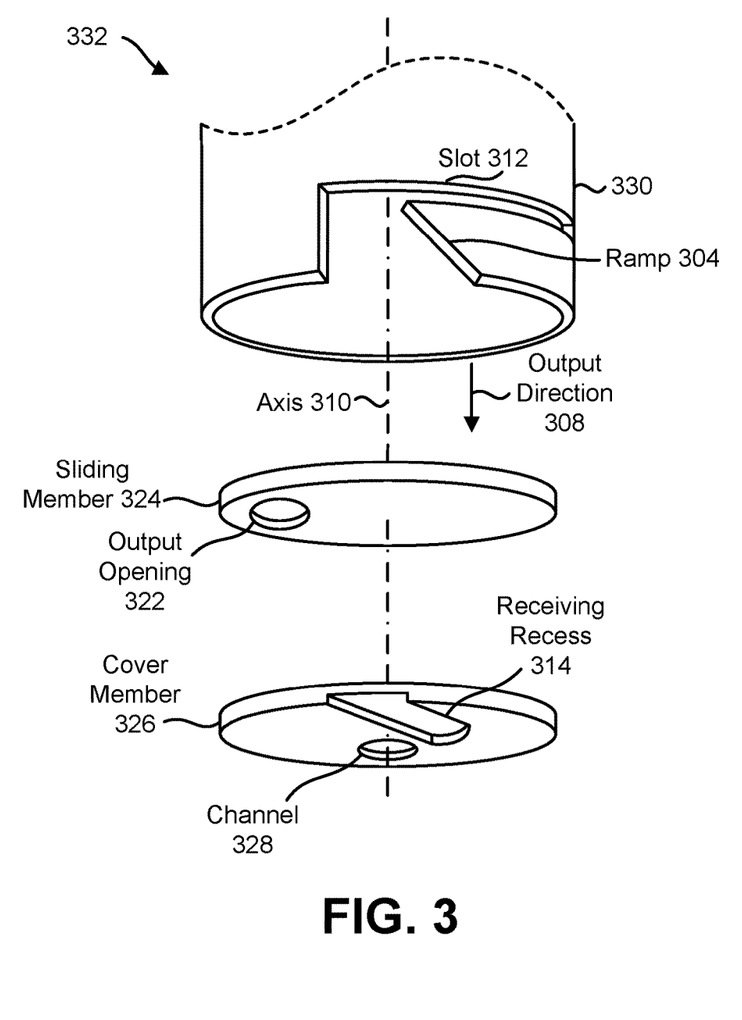
FIG. 3 is an exploded perspective view of an example of an output structure.

FIG. 3 is an exploded perspective view of an example of an output structure 332. In some examples, the output structure 332 may be part of a print particle replenishment device or print particle donor container. A print particle donor container is a container (e.g., bottle, tube, syringe, etc.) adapted to contain and donate (e.g., deliver and/or transfer) print particles to a host device (e.g., a recess of the host device). The output structure 332 described in connection with FIG. 3 may be an example of the print particle replenishment device 100 described in connection with FIG. 1.

In the example of FIG. 3, the output structure 332 is cylindrical in shape. For example, the output structure 332 may be a cylindrical output structure. While the example of the output structure 332 illustrated in FIG. 3 is cylindrical, the output structure 332 may be shaped differently in other examples. For example, the cover member 326 may be square, rectangular, prismatic, triangular, irregularly shaped, or variations thereof (e.g., approximately square, etc.).

In some examples, the output structure 332 may include a ramp 304. The ramp 304 may skew from an end (e.g., bottom) of the output structure to deflect a cover and/or cover arm (e.g., port door and/or door arm) of a host device as the output structure 332 is pressed into a recess (e.g., host device receptacle). For example, the ramp 304 may proceed at a bias (e.g., slant) relative to an output direction 308 and/or axis 310 (e.g., central axis, rotating axis) of the output structure 332.

The output structure 332 may include a cover member 326. The cover member 326 may be situated at a distance within a wall structure 330. In some examples, the cover member 326 may be disposed perpendicular to an axis 310 of the output structure 332 and/or perpendicular to an output direction 308 of the output structure 332. The axis 310 may or may not be a central axis and/or rotating axis of the output structure 332.

In some examples, the cover member 326 may be adapted to maintain a static position with respect to a rotation of a print particle replenishment device about the axis 310. In some examples, the cover member 326 may be adapted to maintain a static position with respect to a rotation of a sliding member 324. For example, the cover member 326 may be adapted to maintain a static position with respect to a cover arm during rotation of the print particle donor container.

In some examples, the cover member 326 may include a receiving recess 314. In some examples, the receiving recess 314 may engage a structure (e.g., cover, cover arm, hinging door, door arm, or other structure) of a host device. For example, the structure may fit within the receiving recess 314. For example, the cover member 326 (e.g., receiving recess 314) may engage a cover arm at the end of the ramp 304. For instance, the cover member 326 may be engaged when the output structure 332 enters a connected undocked position.

In some examples, the structure (e.g., cover, cover arm, etc.) may hold the cover member 326 in a static position during rotation of the output structure 332. For example, the receiving recess 314 may be adapted to hold a hinging door (e.g., cover) and/or door arm (e.g., cover arm) in a static position (with respect to a pivot or hinge, for example) during rotation of the print particle replenishment device. In some examples, the receiving recess 314 may be disposed at an end of a ramp 304. For example, the receiving recess 314 may receive and/or engage with the hinging door and/or door arm when the output structure 332 is fully inserted into a host device receptacle. In some examples, the receiving recess 314 may be an indentation and/or cutout portion of the cover member 326. In some examples, the receiving recess 314 may be shaped to fit the hinging door and/or door arm. In some examples, the receiving recess 314 is a notch that extends to an outer edge of the cover member 326 to engage a structure of a host device. In some examples, the receiving recess 314 is a hole or indentation (e.g., hole or indentation with a circular, square, rectangular, irregular, etc., shape) into which the structure (e.g., cover and/or cover arm) of a host device may fit. For example, the channel 328 may be an elongated indentation into which a cover arm may fit.

In some examples, the output structure 332 may include a slot 312. The slot 312 may be adapted to allow rotation of the print particle donor container relative to a structure (e.g., cover, cover arm). In some examples, the slot 312 may be adapted to impede withdrawal of the print particle donor container when in a rotated position. This may help to ensure a clean transfer of the print particles by keeping the print particle donor container attached when print particles are dispensed.

In some examples, the cover member 326 may include a channel 328. For example, the channel 328 may be offset from the axis 310 of the output structure 332. The channel 328 may allow donation (e.g., transfer and/or delivery) of print particles when the cover is open (and when an output opening 322 is aligned with the channel 328.

The cover member 326 may be implemented in a variety of shapes. In the example of FIG. 3, the cover member 326 is a cover disk with a circular or cylindrical shape. While the example of the cover member 326 illustrated in FIG. 3 is circular or cylindrical, the cover member 326 may be shaped differently in other examples. For example, the cover member 326 may be square, rectangular, prismatic, triangular, irregularly shaped, or variations thereof (e.g., approximately square, etc.).

The output structure 332 may include a sliding member 324. In some examples, the sliding member 324 may be situated within the wall structure 330. In some examples, the sliding member 324 may be disposed perpendicular to the axis 310 of the output structure 332 and/or perpendicular to the output direction 308 of the output structure 332. In some examples, the sliding member 324 may be disposed above the cover member 326. In some examples, the sliding member 324 may be in contact with the cover member 326.

In some examples, the sliding member 324 may include an output opening 322. The output opening 322 may be offset from the axis 310 (of the output structure 332, of a print particle donor container, and/or of a print particle replenishment device). In some examples, the output opening 322 may be adapted to rotate with the print particle donor container (e.g., print particle replenishment device) to align with a port (e.g., input opening) of a host device.

In some examples, the sliding member 324 may be adapted to shear relative to the cover member 326 during rotation of the print particle donor container. For example, as the output structure 332 rotates, the sliding member 324 may rotate with the output structure 332, while the cover member 326 maintains a static position. The rotation of the sliding member 324 may align the output opening 322 with the channel 328 of the cover member 326. In some examples, the cover member 326 may cover the output opening 322 until the output opening 322 is rotated to overlap with a port of a host device. In some examples, a port of the host device may be aligned with the channel 328 upon insertion of the output structure 332. Accordingly, the output opening 322 may be rotated into alignment with the channel 328 and port.

The sliding member 324 may be implemented in a variety of shapes. In the example of FIG. 3, the sliding member 324 is a disk (e.g., an interior disk disposed in the interior of the wall structure 330). While the example of the sliding member 324 illustrated in FIG. 3 is circular or cylindrical, the sliding member 324 may be shaped differently in other examples. For example, the cover member 326 may be square, rectangular, prismatic, triangular, irregularly shaped, or variations thereof (e.g., approximately square, etc.). For example, the sliding member 324 may be shaped as a cone, nozzle, tube, and/or funnel, with the output opening 322 disposed at the end. For example, a funnel structure may help to guide the print particles to the output opening 322 during donation (e.g., transfer and/or delivery).

FIGS. 4A-4E illustrate examples of various stages of print particle donor container 434a-e insertion and docking. For example, the output structure, host device receptacle, and print particle donor container may be situated in line. The print particle donor container may uncover the port when inserting, while docking creates a seal and aligns the output opening with an input opening (e.g., port).

Figure 4A:
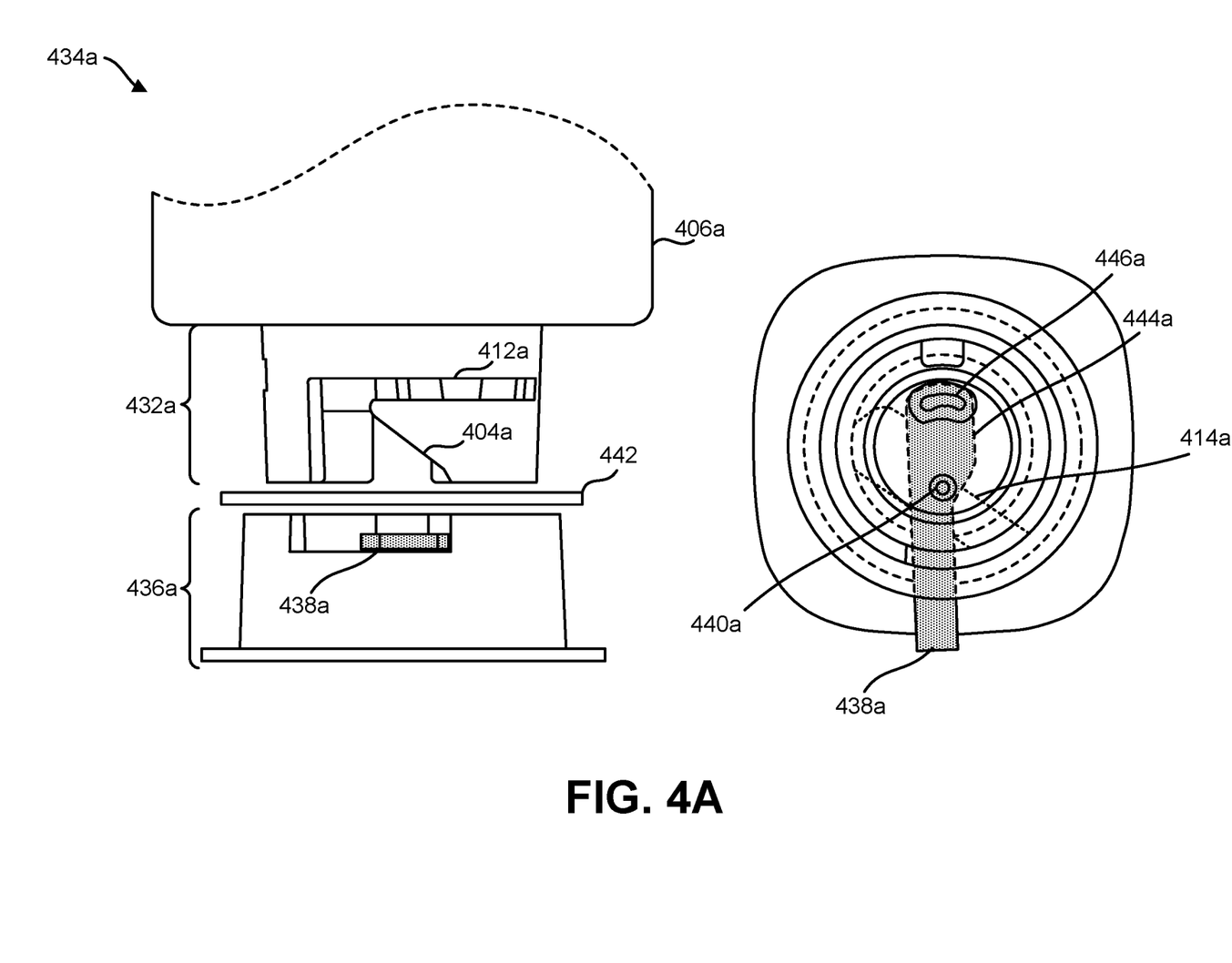
FIG. 4A includes a front side elevational view and a bottom elevational view of an example of a print particle donor container.

FIG. 4A includes a front side elevational view and a bottom elevational view of an example of a print particle donor container 434a. An example of a host device receptacle 436a is also illustrated. The print particle donor container 434a may include a reservoir 406a and an output structure 432a. The output structure 432a may include a ramp 404a, a receiving recess 414a, and a slot 412a. The host device receptacle 436a may include a port 446a, a cover 444a, a cover arm 438a, and a pivot 440a. An example of a housing 442 (e.g., host device housing) is also illustrated. The housing 442 may or may not be part of the host device receptacle 436a.

In the example illustrated in FIG. 4A, the print particle donor container 434a is separate from the host device receptacle 436a. For example, the print particle donor container 434a is unconnected with the host device receptacle 436a.

Figure 4B:
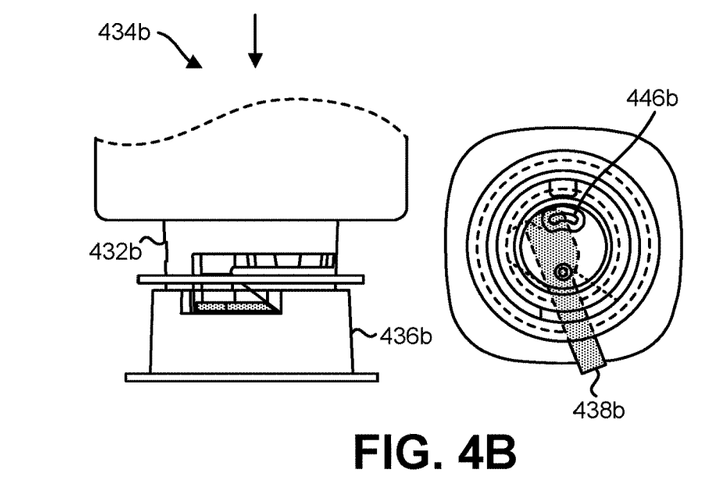
FIG. 4B includes a front side elevational view and a bottom elevational view of another example of the print particle donor container.

FIG. 4B includes a front side elevational view and a bottom elevational view of another example of the print particle donor container 434b. In this example, the print particle donor container 434b (e.g., output structure 432b) is partially inserted into the host device receptacle 436b. The partial insertion partially deflects the cover arm 438b, resulting in the port 446b being partially uncovered.

Figure 4C:
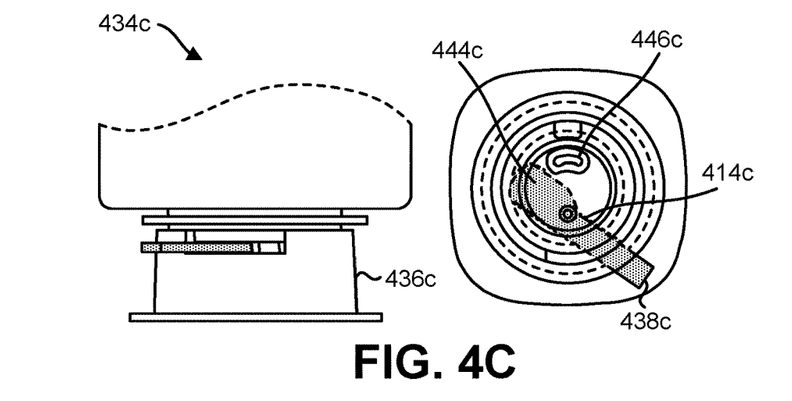
FIG. 4C includes a front side elevational view and a bottom elevational view of another example of the print particle donor container.

FIG. 4C includes a front side elevational view and a bottom elevational view of another example of the print particle donor container 434c. In this example, the print particle donor container 434c (e.g., output structure) is fully inserted into the host device receptacle 436c. For example, the print particle donor container 434c is connected and undocked at this stage. In this example, the full insertion completely deflects the cover arm 438c, resulting in the port 446c being completely uncovered. At this stage, the cover 444c and cover arm 438c are engaged within the receiving recess 414c.

Figure 4D:
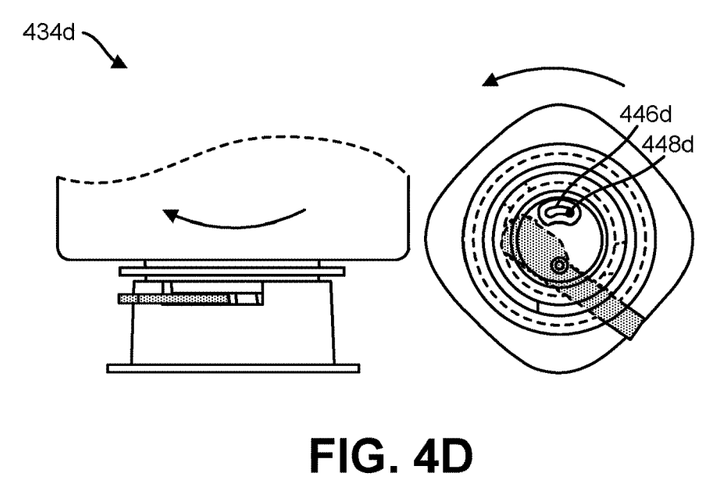
FIG. 4D includes a front side elevational view and a bottom elevational view of another example of the print particle donor container.

FIG. 4D includes a front side elevational view and a bottom elevational view of another example of the print particle donor container 434d. In this example, the print particle donor container 434d (e.g., output structure) is partially rotated (by approximately 45 degrees, for instance). The partial rotation partially aligns an output opening 448d of print particle donor container 434d with the port 446d.

Figure 4E:
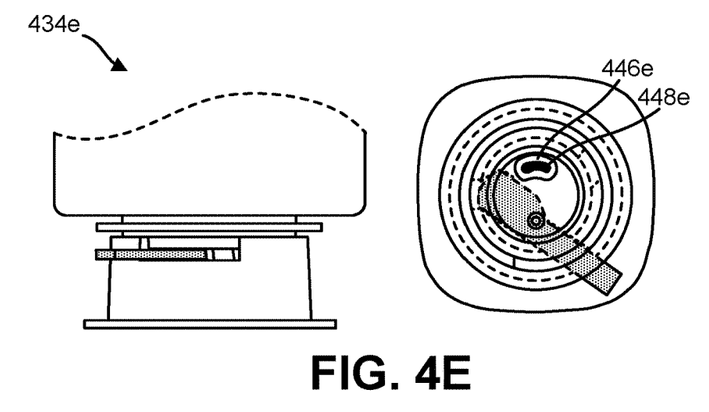
FIG. 4E includes a front side elevational view and a bottom elevational view of another example of the print particle donor container.

FIG. 4E includes a front side elevational view and a bottom elevational view of another example of the print particle donor container 434e. In this example, the print particle donor container 434e (e.g., output structure) is rotated (by approximately 90 degrees, for instance) and docked. For example, the print particle donor container 434e is rotated to the full extent of the rotation range in this example. It should be noted that other ranges of rotation besides 90 degrees may also be implemented. The rotation aligns the output opening 448e of print particle donor container 434e with the port 446e. The print particles may be dispensed through the output opening 448e and the port 446e into the host device.

Figure 5:
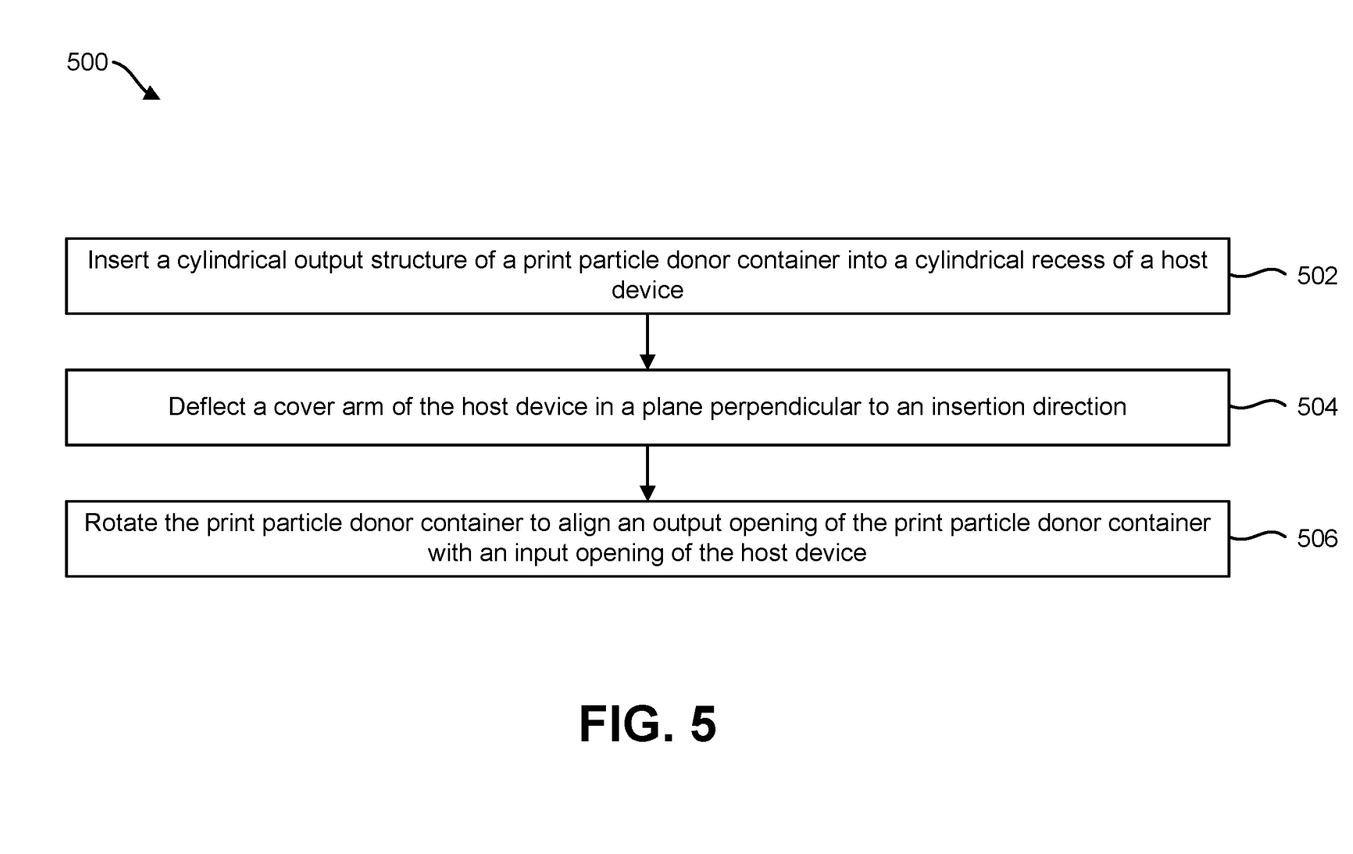
FIG. 5 is a flow diagram illustrating an example of a method for delivering print particles.

FIG. 5 is a flow diagram illustrating an example of a method 500 for delivering print particles. The method 500 may be performed by and/or with one or more of the print particle replenishment devices 100, 200, interfacing portions 102, 202, print particle donor containers 434a-e, and/or output structures 332, 432a-b described herein.

A cylindrical output structure of a print particle donor container may be inserted 502 into a cylindrical recess of a host device. For example, the cylindrical output structure may be pressed downward into the cylindrical recess.

Inserting 502 the cylindrical output structure may deflect 504 a cover arm of the host device in a plane perpendicular to an insertion direction. For example, a ramp of the output structure may slide against the cover arm, causing the cover arm to deflect to a side (e.g., sideways relative to the insertion direction). Deflecting the cover arm may uncover an input opening (e.g., port) of the host device.

The print particle donor container may be rotated 506 to align an output opening of the print particle donor container with an input opening of the host device. For example, a sliding member of the print particle donor container may rotate with the print particle donor container to align an output opening in the sliding member with a channel of a cover member and/or input opening (e.g., port) of the host device.

In some examples, the method 500 may include pushing a syringe plunger into the print particle donor container to deliver print particles through the output opening and the input opening (e.g., port). The syringe may be pushed into the print particle donor container when in a docked position. In some examples, other techniques and/or structures may be utilized to deliver the print particles. For example, a screw structure may be implemented in the print particle donor container, where twisting the screw structure drives the print particles out of the print particle donor container. In another example, a pump mechanism may be implemented to push the print particles out of the print particle donor container. In another example, delivery of print particles may be accomplished by gravity. In another example, the print particle donor container may be constricted (e.g., squeezed) to push the print particles out of the print particle donor container.

The invention claimed is:

1. A print particle replenishment device, comprising:
an interfacing portion comprising a slot and a ramp to actuate a hinging door on a host device receptacle,
wherein the slot is to receive the hinging door and hold the print particle replenishment device on the host device when the print particle replenishment device is rotated.

2. The print particle replenishment device of claim 1, wherein the interfacing portion comprises a cylindrical wall structure.

3. The print particle replenishment device of claim 2, wherein the cylindrical wall structure comprises the slot, wherein the slot is in a plane perpendicular to an output direction of the print particle replenishment device.

4. The print particle replenishment device of claim 3, wherein the slot is to allow the hinging door to maintain a static position during rotation of the print particle replenishment device.

5. The print particle replenishment device of claim 1, further comprising a holding recess at an end of the ramp to hold the hinging door in a static position during rotation of the print particle replenishment device.

6. The print particle replenishment device of claim 1, further comprising an output opening that is offset from an axis of the print particle replenishment device.

7. The print particle replenishment device of claim 6, wherein the output opening is to rotate with the print particle replenishment device to align with a port of the host device.

8. The print particle replenishment device of claim 1, wherein a pivot of the hinging door is offset from a central axis of the print particle replenishment device at engagement.

9. A print particle donor container comprising a cylindrical output structure, the cylindrical output structure comprising:
a ramp skewing from an end of the cylindrical output structure to deflect a cover arm of a host device as the cylindrical output structure is pressed into a recess of the host device; and
a cover disk with a receiving recess to engage the cover arm at an end of the ramp.

10. The print particle donor container of claim 9, the cover disk to maintain a static position with respect to the cover arm during rotation of the print particle donor container.

11. The print particle donor container of claim 9, the cylindrical output structure further comprising a slot to allow rotation of the print particle donor container relative to the cover arm and to impede withdrawal of the print particle donor container when in a rotated position.

12. A method, comprising:
inserting a cylindrical output structure of a print particle donor container into a cylindrical recess of a host device, the insertion deflecting a cover arm of the host device in a plane that is perpendicular to an insertion direction; and
rotating the print particle donor container to align an output opening of the print particle donor container with an input opening of the host device.

13. The method of claim 12, wherein deflecting the cover arm uncovers the input opening of the host device.

14. The method of claim 12, further comprising pushing a syringe plunger into the print particle donor container to deliver print particles through the output opening and the input opening.

* * * * *